United States Patent
Rodriguez Bravo et al.

(10) Patent No.: US 11,789,691 B2
(45) Date of Patent: Oct. 17, 2023

(54) AUDIO MANAGEMENT FOR A PRIORITY COMPUTING DEVICE APPLICATION

(71) Applicant: Kyndryl, Inc., New York, NY (US)

(72) Inventors: Cesar Augusto Rodriguez Bravo, Alajuela (CR); David Alonso Campos Batista, Aurora (CR); Mohamed Zouhaier Ramadhane, Azcapotzalco (MX); Adan Edoardo Herrera Hidalgo, Mexico City (MX)

(73) Assignee: KYNDRYL, INC., New York, NY (US)

( * ) Notice: Subject to any disclaimer, the term of this patent is extended or adjusted under 35 U.S.C. 154(b) by 227 days.

(21) Appl. No.: 17/349,053

(22) Filed: Jun. 16, 2021

(65) Prior Publication Data

US 2022/0405042 A1    Dec. 22, 2022

(51) Int. Cl.
*G06F 3/16* (2006.01)
*H04R 29/00* (2006.01)
(Continued)

(52) U.S. Cl.
CPC ............ *G06F 3/165* (2013.01); *G06F 9/4881* (2013.01); *H04R 3/00* (2013.01); *H04R 29/001* (2013.01);
(Continued)

(58) Field of Classification Search
CPC ......... G06F 3/165; G06F 9/4881; H04R 3/00; H04R 29/001; H04R 2420/01; H04R 2430/01
See application file for complete search history.

(56) References Cited

U.S. PATENT DOCUMENTS 6,996,445 B1 * 2/2006 Kamijo ................... G06F 3/165
                                                     381/104
8,768,494 B1 * 7/2014 Stroud .................... G06F 3/165
                                                     700/94
(Continued)

FOREIGN PATENT DOCUMENTS

JP           6511590 B1    5/2019
WO       2019100556 A1    5/2019

OTHER PUBLICATIONS

Benchmark, "China Online Education Group (COE)—Virus Disruption Propels Online Education Adoption; Raise PT to $38", Mar. 10, 2020, 5 pages.
(Continued)

*Primary Examiner* — Joseph Saunders, Jr.
(74) *Attorney, Agent, or Firm* — Erik Swanson; Andrew M. Calderon; Calderon Safran & Cole, P.C.

(57) ABSTRACT

A method can include identifying an audio output device having a first audio status. In the first audio status, the audio output device can be configured to receive first audio data of at least one software application of a set of software applications of a computing device. In the first audio status, the audio output device can be configured to emit, based on the first audio data, first audio content corresponding to the at least one software application. The method can include identifying a priority software application of the computing device. The method can include assigning, in response to the identifying the priority software application, a second audio status to the audio output device. The assigning can include preventing the audio output device from emitting the first audio content. The assigning can further include configuring the audio output device to emit second audio content of the priority software application.

17 Claims, 7 Drawing Sheets

(51) Int. Cl.
*G06F 9/48* (2006.01)
*H04R 3/00* (2006.01)

(52) U.S. Cl.
CPC ...... *H04R 2420/01* (2013.01); *H04R 2430/01* (2013.01)

(56) References Cited

U.S. PATENT DOCUMENTS

| | | | |
|---|---|---|---|
| 9,118,293 B1* | 8/2015 | Zelenov | H03G 5/005 |
| 9,379,683 B2 | 6/2016 | Marino et al. | |
| 9,681,232 B2 | 6/2017 | Millington et al. | |
| 9,766,853 B2 | 9/2017 | Kallai et al. | |
| 9,977,647 B2 | 5/2018 | Bates et al. | |
| 10,147,426 B1 | 12/2018 | Mese et al. | |
| 10,324,536 B2 | 6/2019 | Erkkila et al. | |
| 10,454,437 B2 | 10/2019 | Apodaca | |
| 10,461,953 B2 | 10/2019 | Jones et al. | |
| 10,776,072 B2* | 9/2020 | Yan | G06F 3/165 |
| 2011/0085679 A1* | 4/2011 | Jakes | H03G 3/342 |
| | | | 381/107 |
| 2014/0093101 A1 | 4/2014 | Lee et al. | |
| 2017/0076334 A1 | 3/2017 | Ben-Yaacov et al. | |
| 2018/0307460 A1 | 10/2018 | Barton et al. | |

OTHER PUBLICATIONS

Idris, N., "Understanding Audio Focus", Oct. 6, 2017, 6 pages.
Businesswire, "Global Academic E-Learning Market 2020-2024 | Increasing E-Learning Enrolments in Higher Education to Boost Market Growth | Technavio", Mar. 20, 2020, 4 pages.
Mell et al., "The NIST Definition of Cloud Computing", Recommendations of the National Institute of Standards and Technology, Sep. 2011, 7 pages.

* cited by examiner

AUDIO MANAGEMENT FOR A PRIORITY COMPUTING DEVICE APPLICATION

BACKGROUND

The present disclosure relates to management of audio output on a computing device, and more specifically, to audio management for computing device applications.

Computing devices, such as notebook, laptop, and desktop computers, can include a plurality of active software applications, each of which can be a source of audio content emitted by an audio output device, such as a speaker. Each of such software applications can allow a user to manually control whether its respective audio content can be emitted by the audio device.

SUMMARY

According to embodiments of the present disclosure, a method can include identifying an audio output device having a first audio status. In the first audio status, the audio output device can be configured to receive first audio data of at least one software application of a set of software applications of a computing device. In the first audio status, the audio output device can be configured to emit, based on the first audio data, first audio content corresponding to the at least one software application. The method can include identifying a priority software application of the computing device. The method can include assigning, in response to the identifying the priority software application, a second audio status to the audio output device. The assigning can include preventing the audio output device from emitting the first audio content. The assigning can further include configuring the audio output device to emit second audio content of the priority software application.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
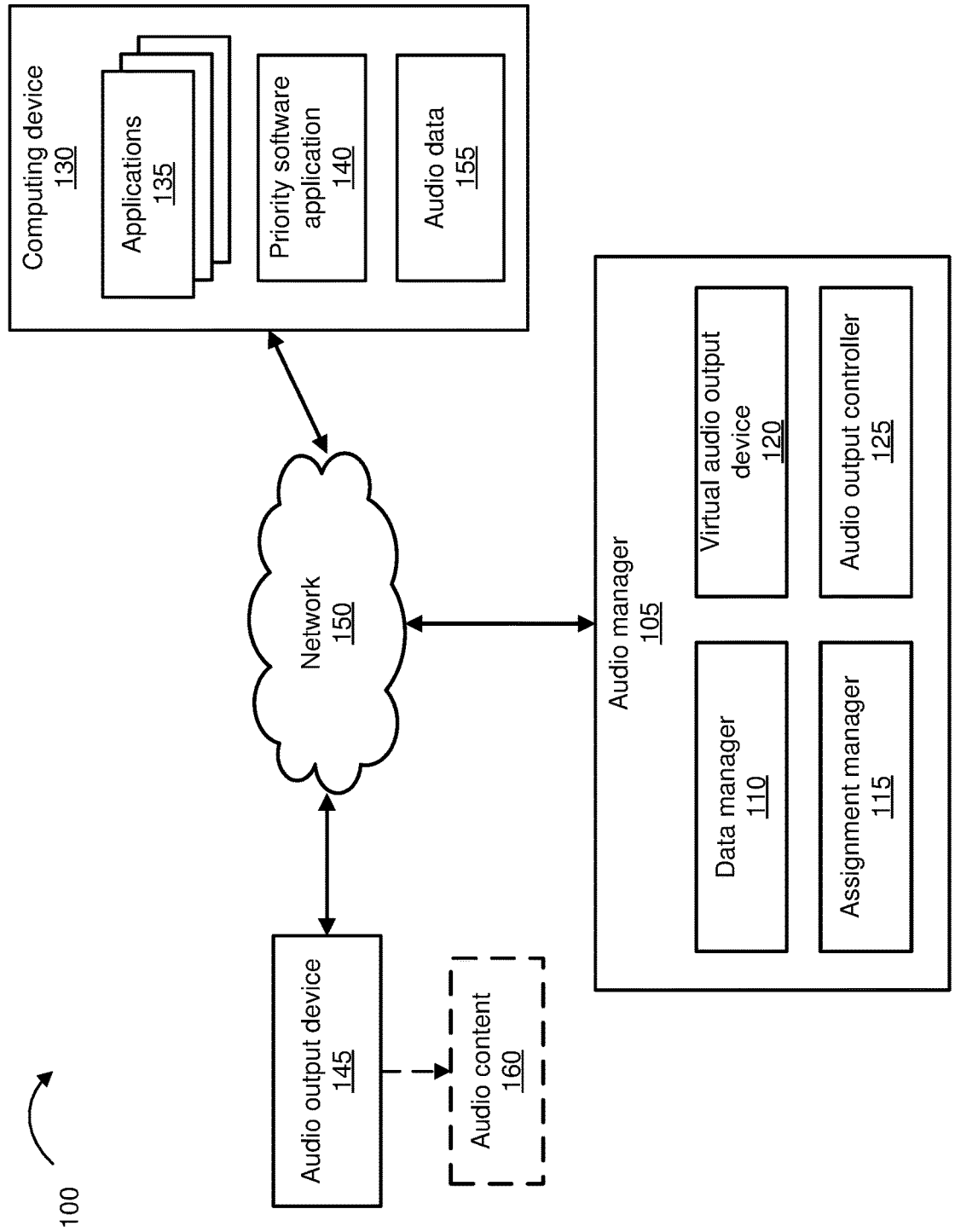
FIG. 1 depicts an example computing environment having an audio manager, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to management of audio output on a computing device; more particular aspects relate to audio management for a priority computing device application. While the present disclosure is not necessarily limited to such applications, various aspects of the disclosure may be appreciated through a discussion of various examples using this context.

Computing devices, such as notebook, laptop, and desktop computers, can include a plurality of active software applications, such as one or more open web browser windows and/or one or more running software programs, each of which can provide audio content. Such audio content can be emitted by an audio output device, such as a set of speakers or a pair of headphones. In some instances, two or more active software applications can simultaneously provide audio content. In these instances, the computing device can permit the audio output device to simultaneously emit the audio content from the two or more active software applications and/or permit a user to control which audio content is emitted by the audio output device.

For example, in some instances, a computing device can include an educational software application (e.g., an online training course), a productivity software application (e.g., a word processing program), and an entertainment software application (e.g., a software application for viewing movies). In this example, all three software applications can simultaneously be active, such that they can simultaneously generate audio content that can be emitted by a user's headphones that are communicably connected to the computing device. In this example, the computing device can permit the user to adjust a volume level of each software application such that: (1) the audio content of only one of the software applications is audible through the user's headphones, (2) the audio contents of only two of the software applications are audible through the user's headphones, or (3) the audio contents of all three of the software applications are audible through the user's headphones.

In some instances, available audio content from a plurality of software applications can facilitate distraction and/or reduced user-productivity. In the example discussed above, audio content available from the entertainment software application can distract the user's focus from the educational software application. Additionally, in the case that the plurality of software applications includes a testing software application (e.g., an online academic exam), available audio content from a plurality of software applications can permit a user to access unauthorized audio content in violation of exam procedures. While a computing device can be configured to allow the user access to only one of a plurality of software applications on the computing device, such a configuration can, in some instances, inhibit productivity and/or a user's focus. For example, a configuration that allows a user to access an online training course and blocks the user's access to software applications that include a word processing program can prevent the user from drafting notes or performing tasks relevant to the online training course.

To address these and other challenges, embodiments of the present disclosure include an audio manager. The audio manager can automatically control the audio content to be emitted from an audio output device of a computing device. More specifically, in some embodiments, the audio manager can identify a priority software application among a plurality of active software applications on a computing device. In response, the audio manager can permit the audio output device to emit audio content corresponding to the priority software application, while preventing the audio output device from emitting audio content corresponding to the remaining active software applications of the computing device. Accordingly, embodiments of the present disclosure can efficiently control an audio output device in a manner that can enhance user productivity.

Turning to the figures, FIG. 1 illustrates a computing environment 100 that includes one or more of each of an audio manager 105, a computing device 130, an audio output device 145, and/or a network 150. In some embodiments, at least one audio manager 105, computing device 130, and/or audio output device 145 can exchange data with at least one other through the at least one network 150. For example, in some embodiments, at least one audio manager 105 can exchange data with at least one computing device 130 through the at least one network 150. One or more of each of the audio manager 105, computing device 130, audio output device 145, and/or network 150 can include a computer system, such as the computer system 501 discussed with respect to FIG. 5.

In some embodiments, the audio manager 105 can be a software application installed on at least one of the computing device 130 and/or the audio output device 145. In some embodiments, the audio manager 105 can be integrated into one or more software applications installed on at least one of the computing device 130 and/or the audio output device 145 (e.g., the audio manager 105 can be included as a plug-in software component of priority software application 140 of the computing device 130). The audio manager 105 can include program instructions implemented by a processor, such as a processor of the computing device 130, to perform one or more operations discussed with respect to FIGS. 2-4.

In some embodiments, the audio manager 105 can include one or more modules, such as data manager 110, assignment manager 115, virtual audio output device 120, and/or audio output controller 125. In some embodiments, the data manager 110, assignment manager 115, virtual audio output device 120, and/or audio output controller 125 can be integrated into a single module. In some embodiments, the data manager 110 can obtain, analyze, store, and/or initiate storage of data. In some embodiments, the assignment manager 115 can implement operations corresponding to assigning a second audio status to the audio output device 145 (this is discussed further with respect to FIGS. 2-4). In some embodiments, the virtual audio output device 120 can receive, store, and/or delete audio data 155 that is not transmitted to the audio output device 145. In some embodiments, the audio output controller 125 can control volume levels of audio content 160 corresponding to one or more applications 135 and/or priority software application 140 (this is discussed further with respect to FIG. 4).

Figure 2:
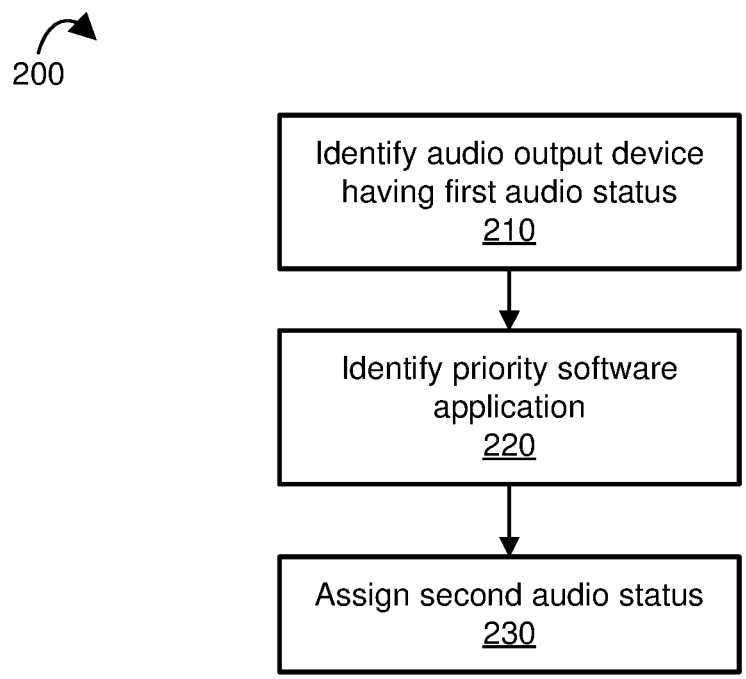
FIG. 2 depicts a flowchart of an example method for managing audio content, in accordance with embodiments of the present disclosure.
Figure 3:
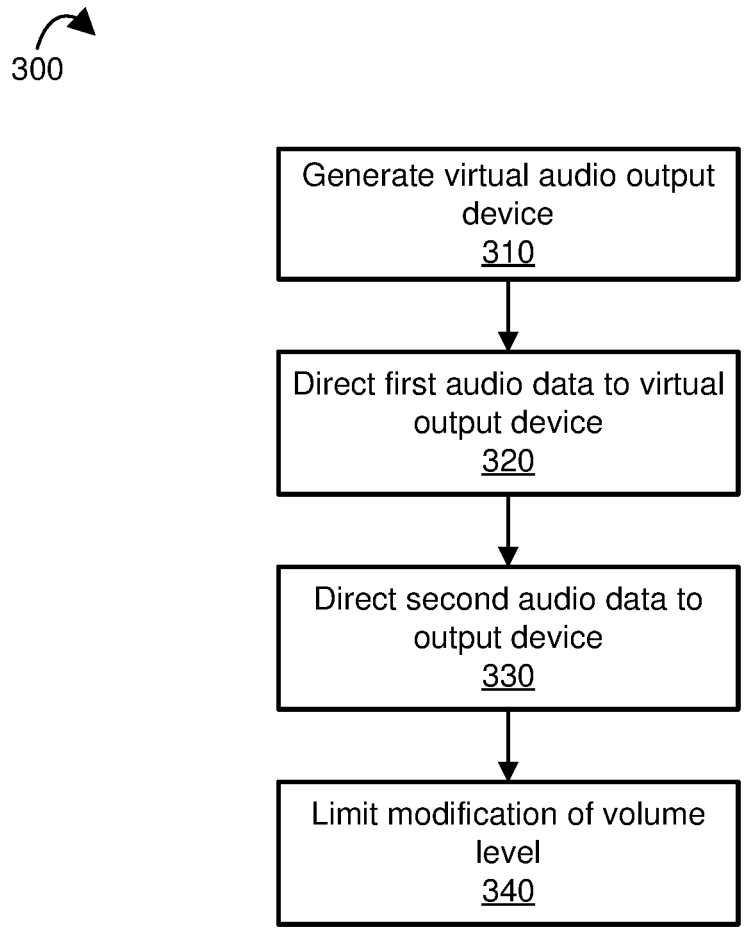
FIG. 3 depicts a flowchart of an example method for managing audio content by generating a virtual audio output device, in accordance with embodiments of the present disclosure.
Figure 4:
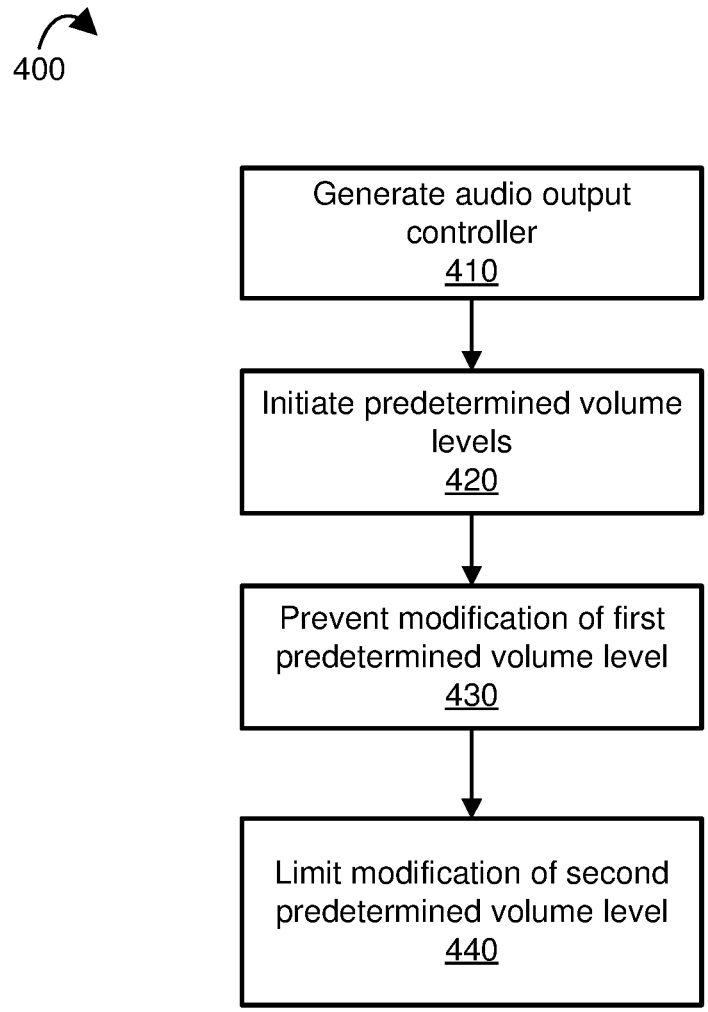
FIG. 4 depicts a flowchart of an example method for managing audio content by generating an audio output controller, in accordance with embodiments of the present disclosure.

In some embodiments, the data manager 110, assignment manager 115, and/or the audio output controller 125 can include program instructions implemented by a processor, such as a processor of the computing device 130, to perform one or more operations discussed with respect to FIGS. 2-4. For example, in some embodiments, the data manager 110 can include program instructions to perform operations 210 and 220, FIG. 2. In some embodiments, the assignment manager 115 can include program instructions to perform operations 230, FIG. 2; operations 310-340, FIG. 3; and operations 410-440, FIG. 4. In some embodiments, the audio output controller 125 can include program instructions to perform operations 420-440, FIG. 4.

In some embodiments, the computing device 130 can be a device such as a mobile phone or a tablet, notebook, laptop, or desktop computer. The computing device 130 can include a set of applications 135, a priority software application 140, and audio data 155. The set of applications 135 can include one or more software applications, such as one or more web browser windows and/or one or more software programs. For example, in some embodiments, the set of applications 135 can include a first web browser window displaying a shopping website, a second web browser window displaying a set of music videos, and a word processing program. In some embodiments, the set of applications 135 can include all of the software applications included on the computing device 130 except the priority software application 140. The priority software application 140 can include a software application, such as a web browser window and/or a software program, to be prioritized by a user with respect to the set of applications 135. For example, in some embodiments, the priority software application 140 can be a web browser window displaying a web-based training course to be prioritized by a user over a web browser window displaying a local news video.

In some embodiments, one or more software applications of the set of applications 135 and/or the priority software application 140 can generate audio data 155 while they are active (e.g., while they are running on the computing device 130). Audio data 155 can include information about audio content 160 corresponding to a software application. For example, in some embodiments, a software application can include a narrated video played through a web browser. In this example, audio data 155 can include information (e.g., digital code) corresponding to the narration in the video. In some embodiments, the computing device 130 or the audio manager 105 can transmit such information to the audio output device 145. In response to receiving the information, the audio output device 145 can emit audio content 160 (e.g., audible sounds of the video narrator speaking) corresponding to the narration in the video.

In some embodiments, the audio output device 145 can include devices such as a set of speakers and/or a pair of headphones that are communicably connected to the computing device 130. As discussed below, in some embodiments, the audio output device 145 can have a first audio status in which it is configured to receive audio data 155 corresponding to one or more software applications of the set of applications 135. In some embodiments, the audio output device 145 can have a second audio status in which it is configured to receive audio data 155 corresponding to the priority software application 140.

In some embodiments, the network 150 can be a wide area network (WAN), a local area network (LAN), the Internet, or an intranet. In some embodiments, the network 150 can be substantially similar to, or the same as, cloud computing environment 50 discussed with respect to FIG. 6.

FIG. 2 illustrates a flowchart of an example method 200 for managing audio content, in accordance with embodiments of the present disclosure. The method 200 can be performed by an audio manager, such as the audio manager 105, FIG. 1.

Referring back to FIG. 2, in operation 210, the audio manager can identify an audio output device having a first audio status. In some embodiments, a first audio status can refer to the audio output device being configured to receive audio data from one or more active software applications of a computing device, and being further configured to emit, based on the received audio data, audio content corresponding to the one or more active software applications. For example, in some embodiments, an audio output device having a first audio status can be a device, such as a set of speakers, configured to emit audio content corresponding to all of the active software applications of the computing device. For example, in some embodiments, a set of computer speakers can be configured to emit audio content such as music from a first web browser of a computing device, speech from collaboration software of the computing device, sound effects from gaming software of the computing device, dialogue from a second web browser of the computing device, audible alerts from word processing software of the computing device, and the like. In some embodiments, the audio output device having the first audio status can be a default device of the computing device, such as a set of speakers integrated into the computing device and preselected by an operating system of the computing device to emit the audio content of the computing device. In some embodiments, the audio output device having the first audio status can be a user-selected device, such as a pair of headphones communicably connected to the computing device by a user.

In some embodiments, operation 210 can include the audio manager obtaining device information from the computing device. For example, in some embodiments, the audio manager can obtain data from the operating system of the computing device indicating that a set of wireless speakers communicably connected to the computing device is configured to emit all of the audio content of the computing device. In some embodiments, operation 210 can include the audio manager obtaining device information from a user of the computing device. For example, in some embodiments, the audio manager can obtain user input (e.g., a user confirmation through a graphical user interface of the computing device) indicating that a set of speakers integrated into the computing device is configured to emit all of the audio content of the computing device. In these embodiments, the audio manager can identify an audio output device having the first audio status based on such device information.

In operation 220, the audio manager can identify a priority software application (e.g., priority software application 140, FIG. 1) of the computing device. In some embodiments, the priority software application can include a software application that is preselected by an entity, such as a programmer and/or a network administrator, to be prioritized by a user over other software applications of the computing device. For example, in some embodiments, a network administrator can select training software installed on a computing device as a priority software application. In this example, the audio content of the training software can be prioritized over the audio content of other software applications of the computing device, as discussed below.

In some embodiments, operation 220 can include the audio manager obtaining an indication that a priority software application is active (e.g., running) on the computing device. For example, in some embodiments, the audio manager can store a process identifier ("process ID"), such as an alphanumeric label, corresponding to the priority software application. In this example, the audio manager can obtain a set of process ID's corresponding to active software applications of the computing device. In some embodiments, the audio manager can obtain the set of process ID's from an operating system of the computing device. Further in this example, in response to identifying the stored process ID among the set of process ID's (e.g., determining that the stored process ID matches a process ID of the set of process ID's), the audio manager can determine that the priority software application is active on the computing device.

In operation 230, in response to identifying the priority software application in operation 220, the audio manager can assign a second audio status to the audio output device identified in operation 210. In some embodiments, assigning a second audio status can refer to the audio manager configuring the audio output device to receive audio data from the priority software application, and to emit, based on the received audio data, audio content corresponding to the priority software application. In some embodiments, assigning the second audio status can include the audio manager configuring the audio output device to exclusively emit the audio content corresponding to the priority software application. For example, in these embodiments, the audio manager can configure the audio output device such that it is prevented from emitting audio content corresponding to software applications of the computing device other than the priority software application of the computing device. In some embodiments, operation 230 can include one or more operations discussed with respect to method 300, FIG. 3. In some embodiments, operation 230 can include one or more operations discussed with respect to method 400, FIG. 4. Accordingly, embodiments of the present disclosure can automatically (e.g., without manual intervention by a user) and efficiently control an audio output device in a manner that can facilitate user-attentiveness to the priority software application.

Additionally, in some embodiments, the audio manager can perform method 200 without changing user accessibility to software applications of the computing device. For example, in some embodiments, the audio manager, in performing method 200, does not prevent a user from accessing software applications of the computing device other than the priority software application. Thus, in some embodiments, a user can simultaneously view and/or utilize software applications, such as a web browser and a word processing program, in addition to a priority software application, such as an online training course. Accordingly, embodiments of the present disclosure can permit a user to perform tasks on the computing device, such as drafting notes and/or reviewing online information, other than utilizing the priority software application. In this way, embodiments of the present disclosure can enhance user productivity while facilitating user-attentiveness to the priority software application.

FIG. 3 illustrates a flowchart of an example method 300 for managing audio content by generating a virtual audio output device, in accordance with embodiments of the present disclosure. The method 300 can be performed by an audio manager, such as the audio manager 105, FIG. 1.

Referring back to FIG. 3, in operation 310, the audio manager can generate a virtual audio output device. In some embodiments, the virtual audio output device can include a software module that mimics an actual audio output device, such as a set of speakers; however, the virtual audio output device does not emit audio content. For example, in some embodiments, a computing device can include a set of audio output devices available to the computing device for emitting audio content of the computing device. In this example, the set of audio output devices can include a set of computer speakers integrated into the computing device and a pair of headphones communicably connected to the computing device. Continuing with this example, the computing device can permit a user, through a graphical user interface, to select the set of computer speakers or the pair of headphones to emit audio content corresponding to all of the active software applications of the computing device (e.g., the set of computer speakers or the pair of headphones can have a first audio status). Continuing with this example, in operation 310, the audio manager can install a virtual audio output device on the computing device. The computing device can treat the virtual audio output device as an additional audio output device for the computing device.

In operation 320, the audio manager can automatically direct audio data corresponding to active software applications of the computing device, other than the priority software application, to the virtual audio output device generated in operation 310. In some embodiments, operation 320 can include the audio manager directing audio data corresponding to all active software applications of the computing device, other than the priority software application, to the virtual audio output device. Thus, in effect, in operation 320, the audio manager can prevent an audio output device (e.g., an actual audio output device) from emitting audio content of active software applications of the computing device, other than the priority software application.

In operation 330, the audio manager can automatically direct audio data corresponding to the priority software application to an audio output device of the computing device (e.g., an actual audio output device). In some embodiments, operation 330 can include the audio manager directing only audio data corresponding to the priority software application to the audio output device. Thus, in effect, in operation 330, the audio manager can permit an audio output device of the computing device to exclusively emit audio content corresponding to an active priority software application. In some embodiments, in addition to audio data corresponding to the priority software application, the audio manager can direct audio data corresponding to predetermined active software applications to the audio output device. For example, in some embodiments, the audio manager can direct to the audio output device audio data corresponding to an operating system alert indicating low battery power of the computing device. In these embodiments, such predetermined active software applications can be selected by an entity, such as a programmer of the audio manager and/or a network administrator.

In operation 340, the audio manager can limit modification of a volume level corresponding to audio content emitted by the audio output device. For example, in some embodiments, the audio manager can select a threshold, such as 30% of a maximum output volume of the audio output device, as a minimum volume level of the audio output device. In this way, the audio manager can prevent a user from modifying below the threshold a volume level corresponding to audio content of a priority software application.

FIG. 4 illustrates a flowchart of an example method 400 for managing audio content by generating an audio output controller, in accordance with embodiments of the present disclosure. The method 400 can be performed by an audio manager, such as the audio manager 105, FIG. 1.

Referring back to FIG. 4, in operation 410, the audio manager can generate an audio output controller. In some embodiments, the audio output controller can include a software module that can control volume levels of audio content corresponding to one or more software applications of the computing device. For example, in some embodiments, the audio output controller can maintain predetermined volume levels of audio content that can be emitted from the audio output device. In this example, the audio output controller can maintain a minimum threshold volume level (e.g., 30% of a maximum output volume of the audio output device) for audio content corresponding to an active priority software application of the computing device. Further in this example, the audio output controller can maintain a volume level (e.g., 0% of a maximum output volume of the audio output device) for audio content corresponding to active software applications of the computing device other than the priority software application. In some embodiments, operation 410 can include the audio manager installing the audio output controller on the computing device.

In operation 420, the audio output controller can automatically initiate predetermined volume levels of audio content corresponding to one or more software applications of the computing device. In some embodiments, such predetermined volume levels can be selected by an entity, such as a programmer and/or a network administrator to facilitate the user-attentiveness to the priority software application. For example, operation 420 can include the audio output controller setting a volume level (e.g., 0% of a maximum output volume of the audio output device) for audio content corresponding to all active software applications of the computing device other than the priority software application. Additionally in this example, operation 420 can include the audio output controller setting a volume level (e.g., 50% of a maximum output volume of the audio output device) for audio content corresponding to the priority software application. Accordingly, in operation 420, the audio output controller can prevent the audio output device from emitting audio content corresponding to active software applications of the computing device other than the priority software application.

In operation 430, the audio output controller can prevent modification of one or more predetermined volume levels initiated in operation 420. For example, continuing with the example discussed above, the audio output controller can disable a user's ability to increase the predetermined 0% volume levels.

In operation 440, the audio output controller can limit modification of one or more predetermined volume levels initiated in operation 420. For example, continuing with the example discussed above, the audio output controller can maintain a threshold (e.g., 25% of a maximum output volume of the audio output device) as a minimum volume level for audio content corresponding to the priority software application.

Accordingly, by operation 430, embodiments of the present disclosure can effectively mute audio content corresponding to active software applications of the computing device other than the priority software application. Additionally, by operation 440, embodiments of the present disclosure can prevent audio content corresponding to the priority software application from being muted. In this way, embodiments of the present disclosure can facilitate user-attentiveness to the priority software application.

Figure 5:
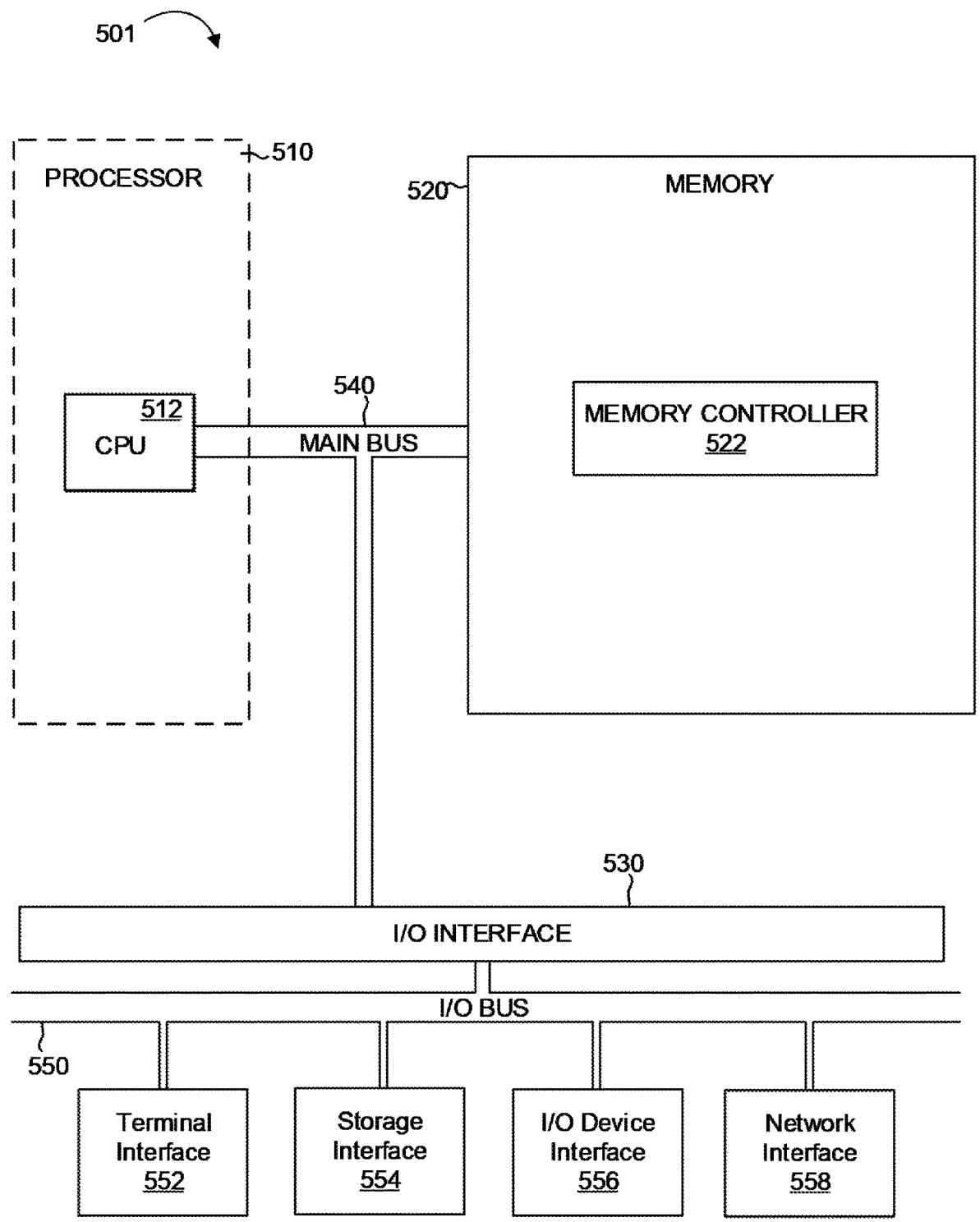
FIG. 5 depicts the representative major components of a computer system that can be used in accordance with embodiments of the present disclosure.

FIG. 5 depicts the representative major components of an exemplary Computer System 501 that can be used in accordance with embodiments of the present disclosure. The particular components depicted are presented for the purpose of example only and are not necessarily the only such variations. The Computer System 501 can comprise a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or non-volatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
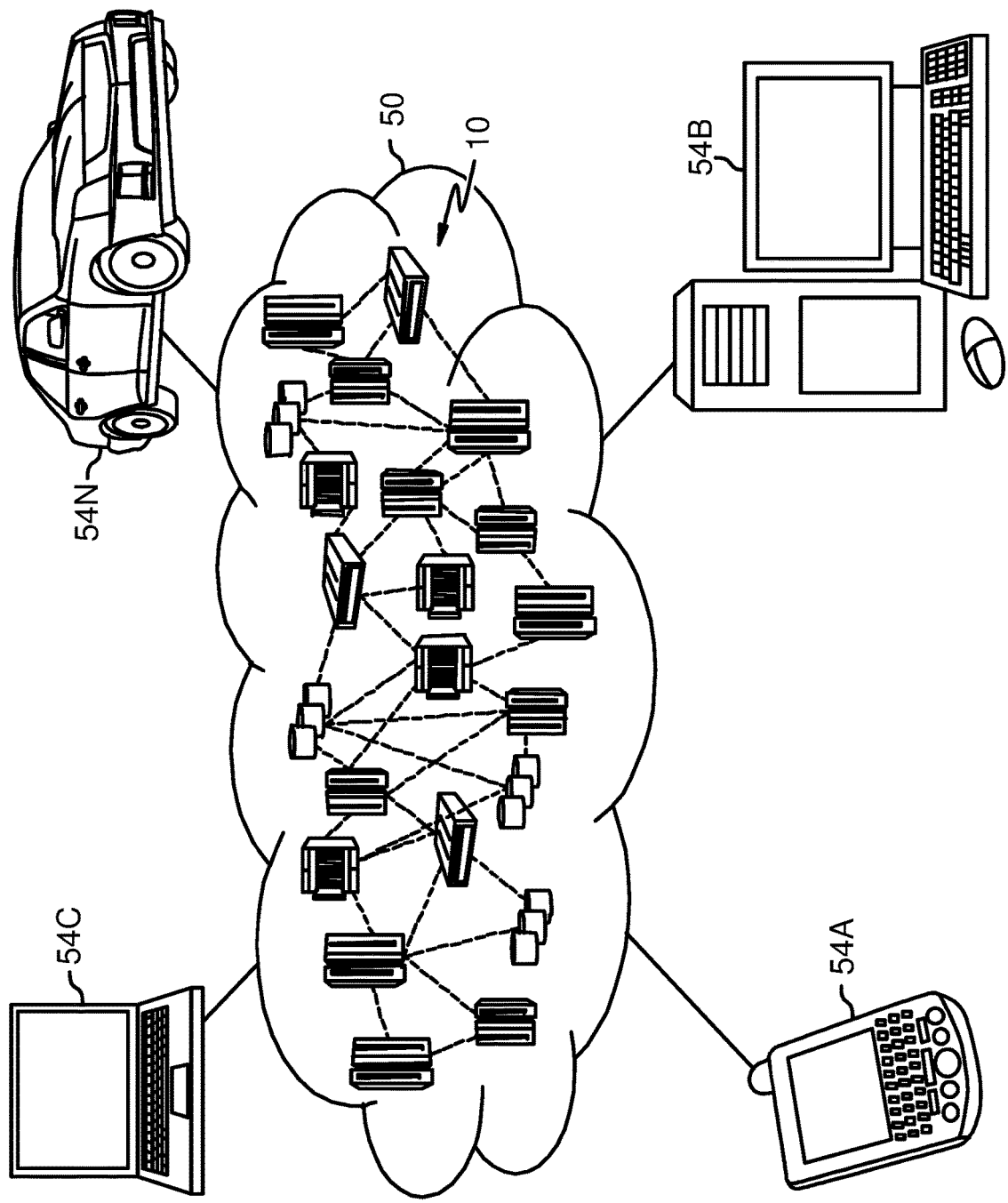
FIG. 6 depicts a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
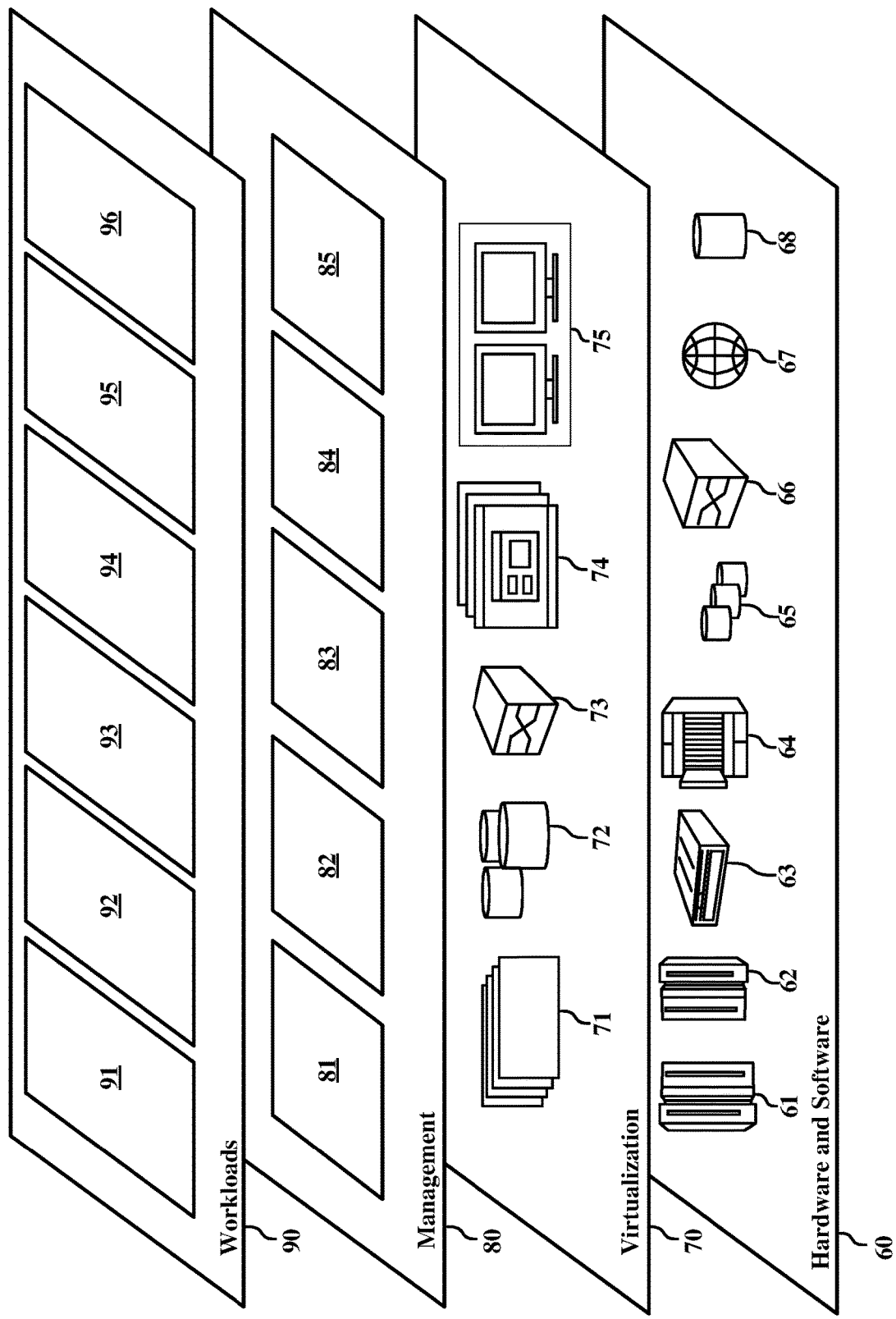
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and audio management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying an audio output device having a first audio status;
    wherein in the first audio status, the audio output device is configured to:
        receive first audio data of at least one software application of a set of software applications of a computing device; and
        emit, based on the first audio data, first audio content corresponding to the at least one software application;
    identifying a priority software application among a plurality of active software applications of the computing device, where the at least one software application is at least one active software application of the plurality of active software applications, and the priority software application is a prespecified priority software application with audio data priority over audio data of other software applications of the set of software applications;

transitioning, in response to the identifying the priority software application, the audio output device from the first audio status to a second audio status;

wherein the transitioning comprises preventing the audio output device from emitting the first audio content in the second audio status; and wherein the transitioning further comprises configuring the audio output device to emit only second audio content of the priority software application in the second audio status, while allowing a user to use one or more software applications of the set of software applications of the computing device simultaneously with the audio output device emitting the second audio content of the priority software application.

2. The computer-implemented method of claim 1, further comprising:
generating, in response to the identifying the priority software application, a virtual audio output device,
wherein the configuring the audio output device further comprises:
directing the first audio data to the virtual audio output device, and
directing second audio data corresponding to the second audio content to the audio output device,
wherein the second audio content is based on the second audio data.

3. The computer-implemented method of claim 2, wherein the second audio content has a corresponding volume level, and
the computer-implemented method further comprises preventing user-modification of the volume level below a threshold.

4. The computer-implemented method of claim 1, wherein user accessibility by the computing device to the set of software applications does not change in response to the assigning.

5. The computer-implemented method of claim 1, wherein the identifying the audio output device comprises obtaining a user input indicating that the audio output device has the first audio status.

6. The computer-implemented method of claim 1, wherein the identifying the priority software application comprises determining that a process identifier corresponding to the priority software application is included in a set of active process identifiers of the computing device.

7. The computer-implemented method of claim 1, wherein the configuring further comprises:
generating an audio output controller, and
assigning, by the audio output controller, a zero volume level corresponding to the first audio content in the second audio status and a predetermined volume level corresponding to the second audio content in the second audio status,
wherein the audio output controller prevents user-modification of the zero volume level in the second audio status.

8. A system comprising:
one or more processors; and
one or more computer-readable storage media storing program instructions which, when executed by the one or more processors, are configured to cause the one or more processors to perform a method comprising:
identifying an audio output device having a first audio status;
wherein in the first audio status, the audio output device is configured to:
receive first audio data of at least one software application of a set of software applications of a computing device; and
emit, based on the first audio data, first audio content corresponding to the at least one software application;
identifying a priority software application among a plurality of active software applications of the computing device, where the at least one software application is at least one active software application of the plurality of active software applications, and the priority software application is a prespecified priority software application with audio data priority over audio data of other software applications of the set of software applications;
transitioning, in response to the identifying the priority software application, the audio output device from the first audio status to a second audio status;
wherein the transitioning comprises preventing the audio output device from emitting the first audio content in the second audio status; and
wherein the transitioning further comprises configuring the audio output device to emit only second audio content of the priority software application in the second audio status, while allowing a user to use one or more software applications of the set of software applications of the computing device simultaneously with the audio output device emitting the second audio content of the priority software application.

9. The system of claim 8, further comprising:
generating, in response to the identifying the priority software application, a virtual audio output device,
wherein the configuring the audio output device further comprises:
directing the first audio data to the virtual audio output device, and
directing second audio data corresponding to the second audio content to the audio output device,
wherein the second audio content is based on the second audio data.

10. The system of claim 9, wherein the second audio content has a corresponding volume level, and
the method further comprises preventing user-modification of the volume level below a threshold.

11. The system of claim 8, wherein user accessibility by the computing device to the set of software applications does not change in response to the assigning.

12. The system of claim 8, wherein the identifying the audio output device comprises obtaining a user input indicating that the audio output device has the first audio status.

13. The system of claim 8, wherein the identifying the priority software application comprises determining that a process identifier corresponding to the priority software application is included in a set of active process identifiers of the computing device.

14. The system of claim 8, wherein the configuring further comprises:
generating an audio output controller, and
assigning, by the audio output controller, a zero volume level corresponding to the first audio content in the second audio status and a predetermined volume level corresponding to the second audio content in the second audio status, wherein the audio output controller prevents user-modification of the zero volume level in the second audio status.

15. A computer program product comprising one or more computer readable storage media, and program instructions collectively stored on the one or more computer readable storage media, the program instructions executable by one or more processors to cause the one or more processors to perform a method comprising:
   identifying an audio output device having a first audio status;
   wherein in the first audio status, the audio output device is configured to:
      receive first audio data of at least one software application of a set of software applications of a computing device; and
      emit, based on the first audio data, first audio content corresponding to the at least one software application;
   identifying a priority software application among a plurality of active software applications of the computing device, where the at least one software application is at least one active software application of the plurality of active software applications, and the priority software application is a prespecified priority software application with audio data priority over audio data of other software applications of the set of software applications;
   transitioning, in response to the identifying the priority software application, the audio output device from the first audio status to a second audio status;
   wherein the transitioning comprises preventing the audio output device from emitting the first audio content in the second audio status; and
   wherein the transitioning further comprises configuring the audio output device to emit only second audio content of the priority software application in the second audio status, while allowing a user to use one or more software applications of the set of software applications of the computing device simultaneously with the audio output device emitting the second audio content of the priority software application.

16. The computer program product of claim 15, further comprising:
   generating, in response to the identifying the priority software application, a virtual audio output device,
   wherein the configuring the audio output device further comprises:
      directing the first audio data to the virtual audio output device, and
      directing second audio data corresponding to the second audio content to the audio output device,
   wherein the second audio content is based on the second audio data.

17. The computer program product of claim 16, wherein the second audio content has a corresponding volume level, and
   the method further comprises preventing user-modification of the volume level below a threshold.

* * * * *